US012091890B1

(12) United States Patent
McIntire et al.

(10) Patent No.: US 12,091,890 B1
(45) Date of Patent: Sep. 17, 2024

(54) ELECTRONIC REMOTELY-CONTROLLED INSWING PORTABLE DOOR LOCK

(71) Applicant: Government of the United States, as represented by the Secretary of the Air Force, Wright-Patterson AFB, OH (US)

(72) Inventors: John P McIntire, Dayton, OH (US); Matt Srnoyachki, Dayton, OH (US); Jason D Sopko, Dayton, OH (US); Adam C Adducchio, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 181 days.

(21) Appl. No.: 17/011,881

(22) Filed: Sep. 3, 2020

Related U.S. Application Data

(60) Provisional application No. 62/895,089, filed on Sep. 3, 2019.

(51) Int. Cl.
*E05C 19/18* (2006.01)
*E05B 47/00* (2006.01)

(52) U.S. Cl.
CPC ........ *E05C 19/182* (2013.01); *E05B 47/0001* (2013.01)

(58) Field of Classification Search
CPC ...... E05C 19/182; E05C 19/184; E05C 19/18; E05B 47/0001; Y10T 292/34; Y10T 292/37; Y10T 292/394; Y10T 70/40
USPC .............................. 292/288, 289, 297; 70/14
See application file for complete search history.

(56) References Cited

U.S. PATENT DOCUMENTS

| | | | | | |
|---|---|---|---|---|---|
| 892,462 | A * | 7/1908 | Stewart | E05C 19/182 | 292/297 |
| 1,171,266 | A * | 2/1916 | Simmons | E05C 19/182 | 292/293 |
| 2,588,077 | A * | 3/1952 | Beadle | E05C 19/182 | 292/295 |
| 4,387,919 | A * | 6/1983 | Quaintance | E05C 19/182 | 292/296 |

(Continued)

FOREIGN PATENT DOCUMENTS

DE 202012102919 U1 * 1/2013 ........... E05C 19/182

*Primary Examiner* — Kristina R Fulton
*Assistant Examiner* — Steven A Tullia
(74) *Attorney, Agent, or Firm* — AFMCLO/JAZ; John T. Addicks

(57) ABSTRACT

A remotely controlled inswing portable door lock apparatus having a blade including a barb at a distal end and a tang at a proximal end. The barb being configured to be disposed within an aperture of a strike plate. The body having a top and a bottom, wherein the body is operably coupled to the tang of the blade. A paddle being moveably coupled to the body and configured to selectively move between a first orientation substantially flush with the top of the body and a second orientation protruding from the top of the body. The apparatus further including a remotely controllable electronics module coupled to the body and configured to operate an electromechanical electromechanical actuator in cooperation with the paddle, and configured to remotely and selectively position the paddle between the first orientation and the second orientation.

4 Claims, 6 Drawing Sheets

(56) References Cited

U.S. PATENT DOCUMENTS

| | | | | | |
|---|---|---|---|---|---|
| 5,297,829 | A * | 3/1994 | Richardson | E05C 19/182 | 292/296 |
| 5,664,814 | A * | 9/1997 | Lin | E05C 19/182 | 292/296 |
| 6,036,242 | A * | 3/2000 | Lin | E05C 19/182 | 292/288 |
| 6,409,236 | B1 * | 6/2002 | Steele | E05C 19/182 | 292/291 |
| 6,926,316 | B2 * | 8/2005 | Patire | E05C 19/182 | 292/290 |
| 10,358,850 | B1 * | 7/2019 | McIntire | E05B 17/2084 | |
| 10,612,283 | B2 * | 4/2020 | Corbett | E05C 19/182 | |
| 2006/0279093 | A1 * | 12/2006 | Tang | E05C 17/166 | 292/288 |
| 2016/0186470 | A1 * | 6/2016 | Finley | E05C 19/182 | 292/339 |

* cited by examiner

ELECTRONIC REMOTELY-CONTROLLED INSWING PORTABLE DOOR LOCK

Pursuant to 37 C.F.R. § 1.78(a)(4), this application claims the benefit of and priority to prior filed Provisional Application Ser. No. 62/895,089, filed Sep. 3, 2019, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to fenestration security products and, more particularly, to auxiliary locking devices.

BACKGROUND OF THE INVENTION

Many facilities provide door locking hardware for use by guests (e.g., hotels), lessees (e.g., apartments), or the like. In such instances, the owner of the property is the owner of the security hardware. The primary user of the hardware, the hotel guest (or the tenant), has no control over the type and quality of the security hardware provided. Moreover, in substantially all cases, the landlord or property manager retains a master key that will operate the lock independent of the user's key. Even in a hotel configuration, wherein an electronic lock may deactivate a maid key if the resident throws the deadbolt, a separate emergency master key will allow management to override the deadbolt. Further, while electronic locks may purport to provide an audit trail of successful and attempted entries, without the tenant or resident owning the hardware, it is impossible to verify the accuracy of the audit trail functionality.

There exists a need in the art for an electronic, remotely-controlled inswing portable door lock, that operates independently from existing locking hardware. When traveling, many people may have access to a traveler's hotel room without their knowledge. Electronic key card access causes many doors to be "locked" to general access, but may be unlocked with an electronic key card possessed by employees, staff or others. Here and abroad, this may also include thieves, organized crime or even foreign government operatives.

Therefore, a means of independently securing one's hotel room door, office door, or other door is desirable. The disclosed and claimed invention does not require door modification and will work with the typical "in swing door" of hotel rooms on either left or right hanging doors. The following invention meets those unique needs, with a unique solution.

SUMMARY OF THE INVENTION

The present invention overcomes the foregoing problems and other shortcomings, draw backs, and challenges of relying on owner-provided locking hardware. While the invention will be described in connection with certain embodiments, it will be understood that the invention is not limited to these embodiments. To the contrary, this invention includes all alternatives, modifications, and equivalents as may be included within the spirit and scope of the present invention. Portable door locks allow virtually any door to be locked during an emergency or for safety and privacy purposes, for doors that don't have existing locks, or for extra layers of security. However, substantially all of those products require emplacement by a user from the interior of the room (the room must be occupied). For travelers in particular, there is a need for the ability to lock a hotel room, for instance, and to be able to leave for the day and know that the room is inaccessible from the cleaning staff, or from illegal or surreptitious entry. We describe the invention of a portable, remotely-controlled inswing door lock that can accomplish this. The lock includes various anti-tamper features, to protect against nefarious, surreptitious methods of defeat: (1) sealed-in pin that mates the locking tab to the lock body, so that there is no way to remove the pin without disassembling the entire lock. (2) Power and control buttons are concealed on the lock body, protected by a closed casing/cover that cannot be accessed without intricate or two-handed manual manipulation. (3) Lock/unlock multi-digit code that must be entered by the wireless remote control device, to protect against signals interception and sniffing attacks.

According to one embodiment of the present invention a door barricade apparatus is provided. The apparatus includes a blade having a barb at a distal end and a tang at a proximal end. The barb is configured to be disposed within an aperture of a strike plate. A body has a top and a bottom, and the body is operably coupled to the tang of the blade. A paddle is moveably coupled to the body and is configured to selectively move between a first orientation substantially flush with the top of the body and a second orientation protruding from the top of the body. A remotely controllable electronics module coupled to the body and configured to operate an electromechanical actuator in cooperation with the paddle, and configured to remotely and selectively position the paddle between the first orientation and the second orientation.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

For the sake of clarity in the discussion that follows, the terms "secure side" or "attack side" may be equated with "exterior" and "occupant side" shall be equated with "interior."

The present electronic portable door locks allows a plurality of known inswing lockable doors to be secured from entry from those that might otherwise have a key or access to the interior of the room being secured. For travelers in particular, there is a conceivable need for the ability to lock a hotel room, for instance, and to be able to leave for the day and know that the room is inaccessible from the cleaning staff, or from illegal or nefarious entry. We describe the invention of a portable, remotely-controlled inswing door lock that can accomplish this. Uniquely, the present invention allows locking a swing-in door from the outside securely, without modification or installation damage to the door, door frame, wall, floor, or other building infrastructure. (many "portable" locks or add-on barricade devices screw into floors, frames, and doors causing irreversible damage and potentially altering door fire safety ratings).

Figure 1:
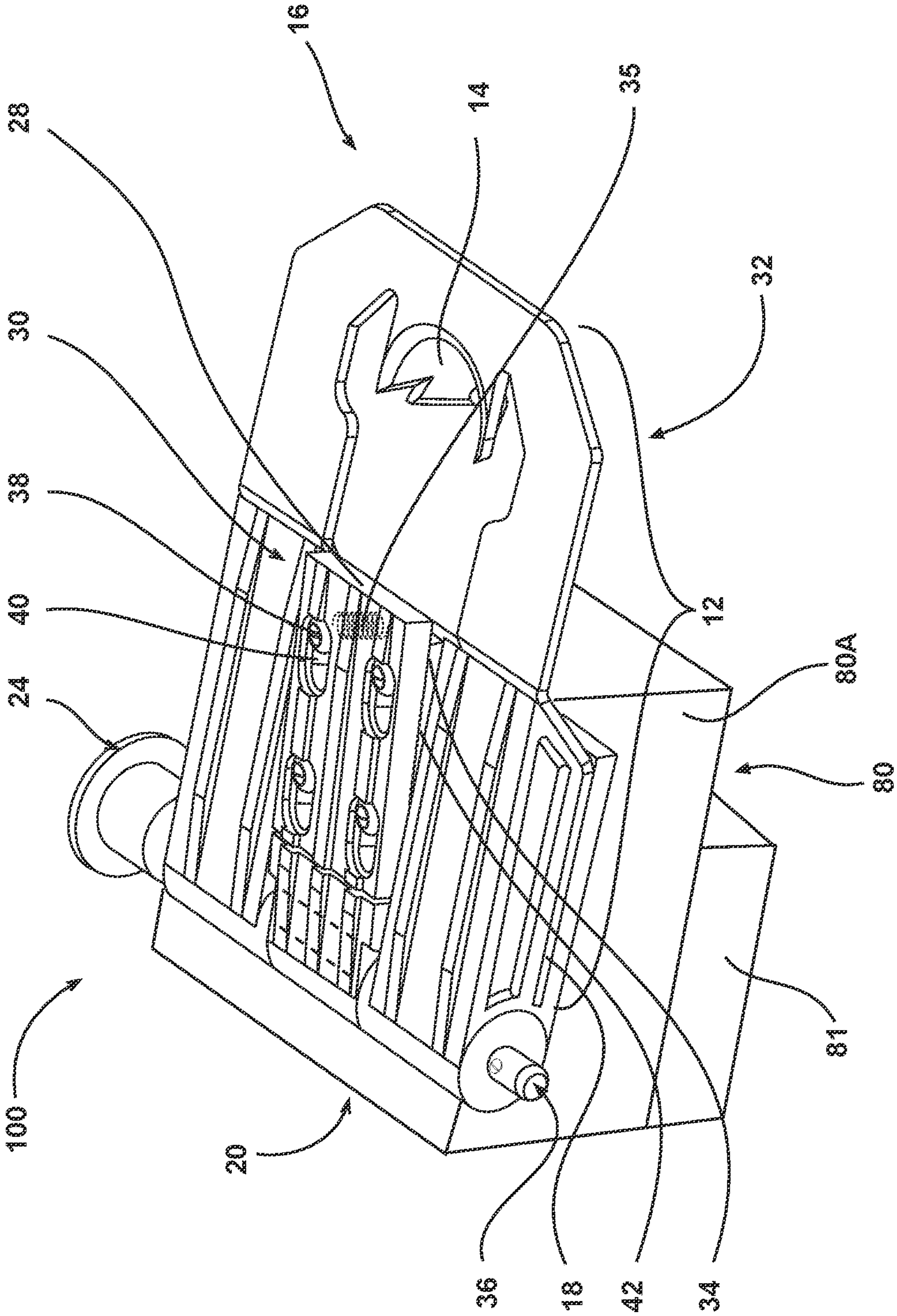
FIG. 1 is a perspective view illustration of an embodiment of the disclosed invention.

Turning attention to FIG. 1, an embodiment of the disclosed inswinging door barricade apparatus 100 is shown. A blade 12 is configured with a barb 14 proximate a distal end 16 and with a tang 18 proximate a proximal end 20. In some embodiments of the disclosed invention, the barb 14 may be integral to the blade 12 by way of stamping, swaging, displacing, or otherwise manipulating the material of the blade 12 so as to depart from the general plane thereof. In other embodiments, the barb 14 may comprise a pin, bolt, rivet, or other protuberance that is affixed substantially perpendicular to the plane of the blade 12. Whether the barb 14 is established by additive means or is integral to the blade 12, it may include features know by one of ordinary skill in the art to enhance the resistance to shear forces applied thereto. By way of example, and not limitation, the barb 14 may include conical or cylindrical features, fillet or ribbed reinforcements, a mounting angle inclined toward the applied shear force, or the like.

At least a portion of a tang 18 is subsumed by a body 80. The portion of the tang 18 may be secured to the body 80 by way of mechanical fasteners, overmolding the body 80 around the tang 18, adhesives, or other means known to one of ordinary skill in the art. The body 80 may include includes an electromechanical actuator 24, a paddle 28 and as shown as illustrated the body bottom 80A. The electromechanical actuator 24 is operably coupled to the paddle 28 and is configured to be engaged by electronic signal from for example, the operator's phone or a controller fob. In at least one embodiment, the electromechanical actuator 24 may be a servo, a solenoid, a motor and gear train, a linear actuator, or the like. In some embodiments, the centerline plane of the electromechanical actuator 24 may be substantially coplanar with the top 30 of the apparatus 100.

In some embodiments, the electromechanical actuator 24 may be operably coupled to the paddle 28 by way of an electromechanical actuator extension 34. The electromechanical actuator 24 and cooperating electromechanical actuator extension 34 may rotate about a centerline of a shaft 36. The travel, or degree of rotation permitted to the electromechanical actuator 24 and cooperating electromechanical actuator extension 34 may be limited by means known to one of ordinary skill in the art. Additionally, the electromechanical actuator 24, or electromechanical actuator extension 34 may be biased in one rotational direction. That is, a spring 35 or other resilient member (also illustrated with in FIG. 4A and FIG. 4B) may be applied to either the electromechanical actuator 24, the electromechanical actuator extension 34, or to the paddle 28, to bias the paddle 28 away from the top 30 of the apparatus 100. As a result, in some embodiments, the apparatus 100 may secure a door merely by pushing the door shut (slam lock) on the emplaced apparatus 100, thus allowing the door to temporarily deflect the paddle 28. The paddle 28 thereafter returns to its projected position automatically by way of the resilient member. To remove the apparatus 100, a user may then apply a force upon the electromechanical actuator 24 in a direction from a bottom 32 to a top 30 of the apparatus 100. Such a force, if sufficient to overcome the bias and other forces applied to the apparatus 100 will align the paddle 28 substantially coplanar (or flush) with the top 30 of the apparatus 100. In some embodiments, the paddle 28 may pivot about an axis of rotation (as depicted in FIG. 1 by way of the shaft 36), or, in other embodiments, the paddle 28 may reciprocate axially between flush and protruding configurations (as a protruding pin, peg, or other projection).

To disengage the apparatus 100 and reenter the room from the outside, paddle 28 may be retracted flush with top 30 by the electromechanical actuator 24 (servo 26 FIG. 4A and FIG. 4B), which is itself activated by a remotely controllable electronics 81. In one embodiment the remotely controlled electronics 81 may include a power source. The power source may be any means known in the art such as lithium ion 14500 cells are used in parallel to power the system. The charging circuit contains a microchip lithium-ion charging integrated circuit (IC). The charger IC is powered by 5 VDC through the micro USB port when the system is plugged in. Charging may be handled by the IC and three indicators are provided to show the charging status. When plugged in, the batteries are disconnected from the system using a MOSFET and the system runs on the 5 VDC through the micro USB port in order to decrease battery charge time and allow for use during charging.

The remotely controlled electronics 81 may be controlled by a phone app using Bluetooth, cell service, wifi, Radio Frequency (RF) key fob, or any other means of secure communication known in the art. The remotely controlled electronics 81 may include components including a PIC microcontroller and include sub-circuits such as a 3.3V regulator, an accelerometer, a power charger, memory, servo control, and Bluetooth communication circuitry. The Bluetooth circuitry may include a Bluetooth radio, and/or an all-in-one Bluetooth Low Energy (BLE) module, and the like. A receiver may be built-in that handles all Bluetooth link functions. The module may be used as a serial data pipe allowing for serial communication over BLE between the module's microcontroller and the user control interface contained in a mobile device (mobile phone). Alternative methods of control include an RF key fob that allows for PIN-protected entry or acoustic sensing requiring a user predefined knock pattern for entry, among other possibilities of interaction. In some embodiments, dedicated hardware may be used to communicate with the remotely controlled electronics 81, and in other embodiments a smartphone or other multipurpose computing device such as a smart phone may be configured to communicate with the remotely controlled electronics 81. In a preferred embodiment, the protocol used to communicate with the remotely controlled electronics 81 may be encrypted, code hoping, channel hopping, or otherwise robust to cloning or electronic bypass.

The remotely controlled electronics 81 may include an accelerometer circuit. The accelerometer circuit may be used for sensing physical activity at the door and/or lock tampering. When the door lock is in place and the door is tampered with, the accelerometer is designed to sense the movement. A signal is asserted at a microcontroller input to log the activity. Alternatively, a text message and/or phone call may be made to the controlling phone. A latching circuit may be used to prevent missed events and the threshold for what qualifies as an event can be adjusted using an on-board potentiometer. In one embodiment the onboard potentiometer notification level may be adjusted using the phone app.

An electrically erasable programmable read-only memory (EEPROM) IC is used to log any events detected by the accelerometer circuit. The microcontroller reads/writes to/from the EEPROM over an I2C data bus. In other embodiments sensors may include, pressure sensors, strain gauges, and the like for tamper or activity logging, or as part of an alerting function to the user. Embodiments may enable real-time alerting via some long-range wireless connectivity or, alternatively as post-hoc tamper analysis performed by log data download.

In one embodiment the remotely controlled electronics 81 may include a smart battery such that if the lock battery is low and about to run out of power sufficient to unlock itself, the apparatus 100 will detect this condition and move the lock into the unlocked position. Thus precluding the apparatus from becoming unopenable due to power loss in the locked condition and permanently locking the occupant out of his/her own room.

In order to extend the time of operation from a single charge, the controller will put itself to sleep when not actively being used. The controller wakes up upon a first transmission from the user control. Time of operation may be extended indefinitely by connecting a standard power cable into the USB port on the device, and plugging the power cable into a nearby electrical wall outlet, or via portable "power brick" battery to extend the use of the device for a single session beyond its own onboard battery life.

In other embodiments, structures intervening between the electromechanical actuator 24 and the paddle 28 may reverse the direction of paddle 28 travel in response to a force applied by a user. For example, in some embodiments, gears, levers, eccentric surfaces, or the like may allow a user to apply a force to the electromechanical actuator 24 in a direction from the top 30 to the bottom 32 of the apparatus 100, which results in the paddle 28 becoming substantially coplanar with the top 30 of the apparatus.

The remotely controlled electronics 81 may include components including a PIC microcontroller and include subcircuits such as a 3.3V regulator, an accelerometer, a power charger, memory, servo control, and Bluetooth communication circuitry.

The 3.3V regulator circuit has a 3.3 VDC low drop-out linear regulator that accepts 3.4 VDC to 5 VDC and outputs a constant 3.3 VDC. This powers all circuitry on-board the controller excluding the servo. The power control button turns on a MOSFET which switches power to the regulator and an LED indicates when voltage is present at the regulator's input. A latching circuit may be used to prevent missed events and the threshold for what qualifies as an event can be adjusted using an on-board potentiometer.

In one embodiment two lithium ion 14500 cells are used in parallel to power the system. The charging circuit contains a microchip lithium-ion charging integrated circuit (IC). The charger IC is powered by 5 VDC through the micro USB port when the system is plugged in. Charging is handled by the IC and three indicators are provided to show the charging status. When plugged in, the batteries are disconnected from the system using a MOSFET and the system runs on the 5 VDC through the micro USB port in order to decrease battery charge time and allow for use during charging.

The lock controller printed circuit board (PCB) is a two-layer board design containing the control circuitry on the topside and the batteries and charging circuitry on the bottom side. Three surface-mount buttons (referenced in the "User Interface" section) are located on the topside and are accessible through cutouts in the top cover of the lock body. A micro USB port is also accessible through the top cover for charging the batteries. An SMA RF connector is mounted on the side of the PCB and protrudes through the lock body to allow for an external Bluetooth antenna maximizing operational range and signal quality. The images below show the copper design layout along with 3D models of both sides of the controller PCB.

From the outside of a room with an inward-swinging door that one wishes to be locked (for instance, a hotel or office room), the user starts with the door in the open position. The lock is powered on and placed in its position with the lock's notch interfacing in the strike plate hole in the door frame. The door is allowed to swing shut, closing completely past the main body of the lock. With the user standing outside the closed door, and the lock is on the opposite side of the door, inside the room, with the locking tab in the 'unlocked' position. Next, the user activates the lock with a wireless remote control device, which then positions the lock tab into the 'locked' position by swinging the tab via a mechanical actuator into the path of the door and preventing it from being pushed open from the outside. The user is free to leave for some period of time, and upon return, must remotely activate the lock again, this time instructing the device to return the locking tab into the unlocked position.

In some embodiments of the disclosed invention, the spatial relationship between the center of mass of the paddle 28, with respect to the distal end 16 of the blade 12 (and by extension with respect to the barb 14) may be adjusted. For example, as shown in FIG. 1 clamping fasteners 38 may be disposed within eccentric channels 40. Loosening of the clamping fasteners 38 may permit the paddle 28 to reciprocate with respect to the electromechanical actuator extension 34 and within the positional limits established between the interface of the clamping fasteners 38 and the eccentric channels 40. Tightening the clamping fasteners 38 thereafter fixes the spatial relationship between the paddle 28 and the distal end 16 of the blade 12.

Figure 3:
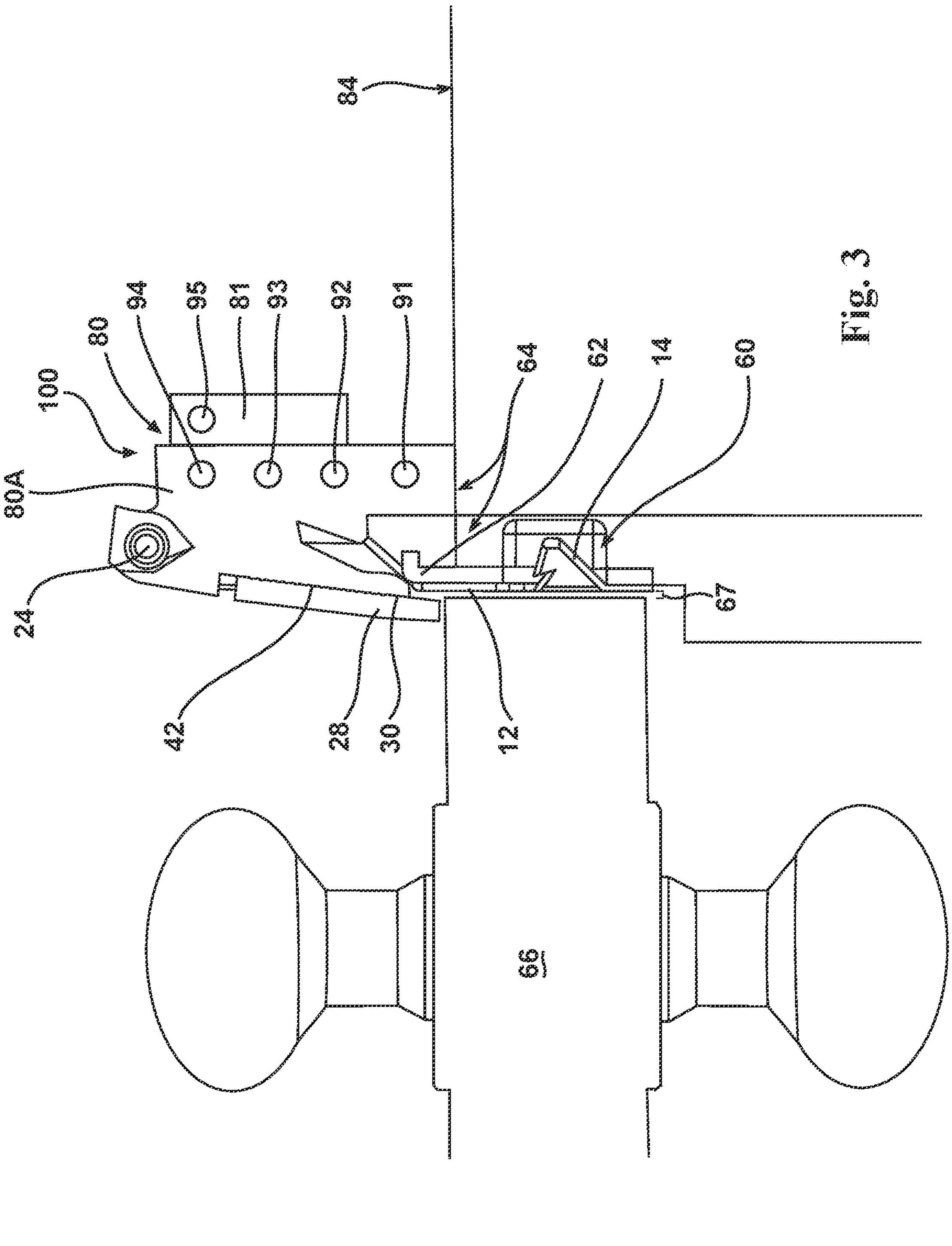
FIG. 3 is a top view partial cut-away illustration of an embodiment of the disclosed invention, in use, securing a door in the closed position.

In some embodiments, indexing features 42 in FIG. 1 and FIG. 3 may be included on the paddle 28 and the electromechanical actuator extension 34. The indexing features 42 of the paddle 28 and the indexing features 42 of the electromechanical actuator extension 34 are configured to mate in a tight-fitting relationship. The indexing features 42 may include, by way of example and not limitation, grooves, channels, stippling, splines, projections and bores, or other features known by one of ordinary skill in the art to index the relationship of the paddle 28 with respect to the electromechanical actuator extension 34 as discrete (or analog?) increments. Embodiments of the disclosed invention comprising indexing features 42 yield enhanced resistance to displacement of the spatial relationship of the paddle 28, as compared to relying solely upon frictional forces established between the paddle 28, electromechanical actuator extension 34, and clamping fasteners 38. Additionally, in some embodiments, the angle established between the projected paddle 28 and the top 30 may be adjusted by a user. For example, a projected angle between the paddle 28 and the top 30 of 5 degrees may be sufficient to provide secure locking action on most doors, but a projected angle of 10-20 degrees may be required to secure doors with large gaps (a margin 67, FIG. 3) between the door and jamb or frame. In embodiments that utilize a reciprocating pin in lieu of the pivoting paddle 28, the distance of the pin's projection may be analogously adjusted to achieve a greater projection from the top 30.

Figure 2:
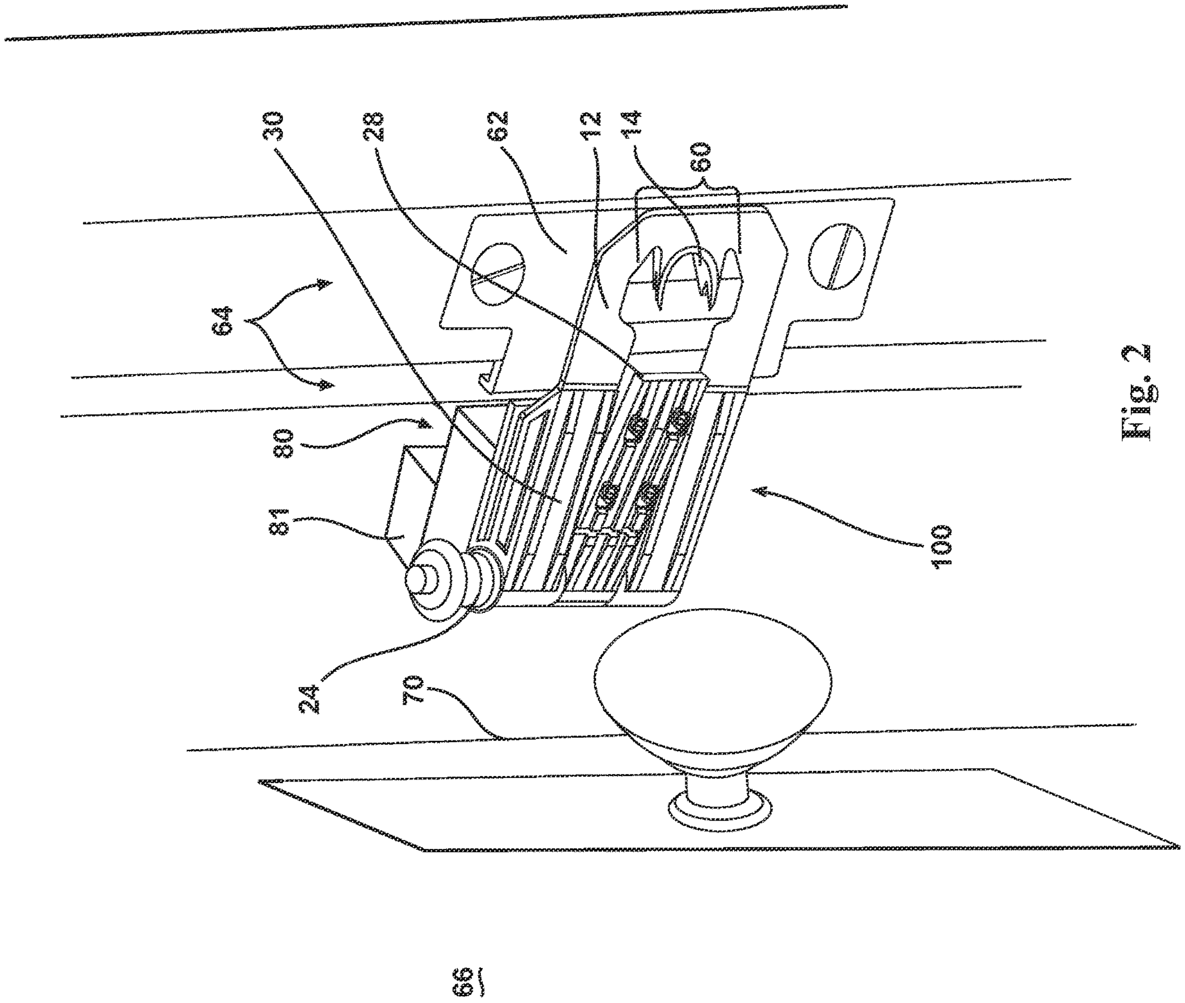
FIG. 2 illustrates an embodiment of the disclosed invention emplaced within the aperture of a strike plate of a door jamb.

The electromechanical actuator 24, as depicted in FIG. 1 is established by way of a modification to the shaft 36. In normal use, as will be explained in detail below, the shaft 36 serves as a pivot point for the electromechanical actuator 24. The paddle 28 in conjunction with its cooperating electromechanical actuator extension 34 and electromechanical actuator 24 serve to interfere with the movement of a door (FIGS. 2-3).

When attached to a door, manipulation of the electromechanical actuator 24 by the remotely controlled electronics 81 is the primary means to in turn retract the paddle 28 by making the paddle 28 substantially co-planer with the top 30 of the apparatus 100. However if one wishes to disable the interference of the paddle 28 upon the door by alternate means, some embodiment may include an emergency release that disengages the electromechanical actuator 24 from the paddle 28, thus allowing egress by alternate means.

Additionally, the electromechanical actuator 24, may be declined at a downward angle (sloping from the top 30 to the bottom 32 of the body 80), so that the apparatus 100 is guided into proper alignment (even if sub-optimally placed with respect to the door and the door frame), by the slamming door.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Turning attention to FIG. 2, in use, the barb 14 of the blade 12 is placed within the aperture 60 of the strike plate 62 affixed to a door jamb 64 with the body 80 and the remote control electronics module 81 of the lock internal to the room of an in-swing door 66 having a lock face 70. The door jamb 64 includes the wall portion facing the door lock face 70 when the door 66 is closed, and any primate portion upon which the the apparatus rests upon when engaged as illustrated in FIG. 3. As shown in FIG. 2, the paddle 28 is depicted in the protruding orientation or configuration (not co-planer with the top 30 of the apparatus 100). The apparatus 100 is held against the door jam 64 by the barb or barbs 14 of blade 12 being inserted into the strike plate aperture 60, which hold the apparatus 100 in place while the door is being closed from the outside of the inswing door 66. The door 66 can then be pulled shut and the user may initiate the electromechanical actuator 24, the spring bias of the paddle 28 will cause the paddle 28 to extend in the locked configuration (See FIG. 4B).

Turning attention to FIG. 3, the apparatus 100 is shown trapped within the margin 67 of the door 66 and door jamb 64 by way of the interference of the barb 14 (not visible in this figure) disposed within the aperture 60 of the strike plate 62. The door Jamb 62 includes the The paddle 28 prevents the door 66 from being opened until such time as the paddle 28 is withdrawn flush and co-planer with the top 30 of the apparatus 100, the servo 26 is activated, or forces applied to the door 66 and apparatus 100 result in mechanical failure.

As illustrated in FIG. 3, control lights and buttons on the body and preferably a body top 80A include a Power On/Off Button 91, a Test Button 92, a Pair Button 93 (to control device), a status indicator light 94, a power indicator light 95, and the like. Preferably the control lights and buttons are operably connected to the remote controllable electronics 81.

As will be recognized by one of ordinary skill in the art, when the apparatus 100 is in place on a closed door 66, an attempt to open the door 66 imparts a force upon the paddle 28. The force experienced by the paddle 28 is predominantly a shear force, but that shear force is further translated to the body 80 and barb 14. Since the barb 14 is trapped within the aperture 60, the body 80 absorbs the force of the opening door 66 as a torque that will tend to (if viewed as depicted in FIG. 3) rotate the body 80 in a clockwise direction. Under extreme force, the body 80 may be sufficiently rotated, such that the paddle 28 no longer interferes with the opening of the door 66. To counteract this torque, the body 80 may be reinforced by any means know in the art. As discussed herein "wall" may be understood to be any robust surface adjacent the door 66, to include drywall, masonry, wood or metal casing or framing, or the like. With the apparatus 100 in place, an applied force would need to be sufficient to shear off the barb 14, shear off the paddle 28, cause tensile failure of the blade 12, or failure of some other interconnecting components like the paddle indexing feature 42, illustrated in FIG. 1.

Figure 4A:
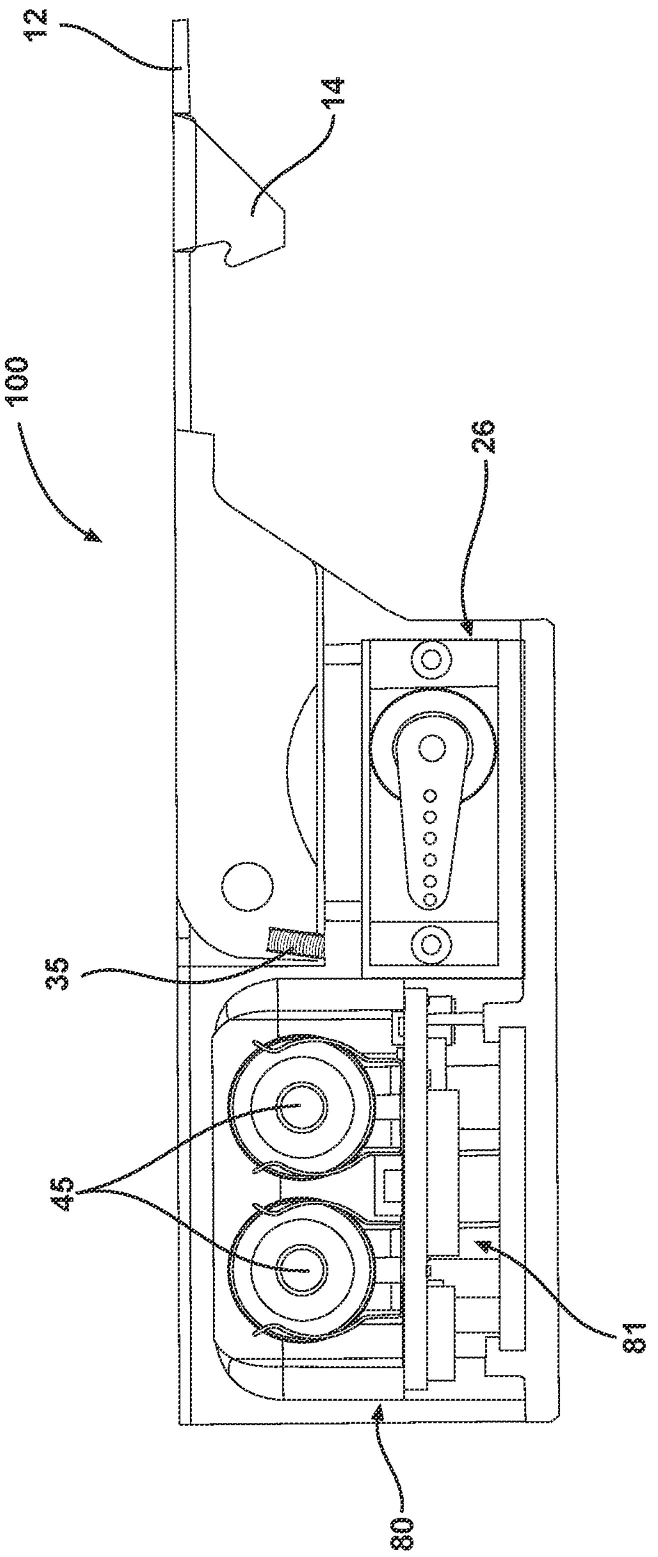
FIG. 4A and FIG. 4B depict a partial cutaway of an embodiment of the disclosed invention with a servo configured in a first position and in a second position.
Figure 4B:
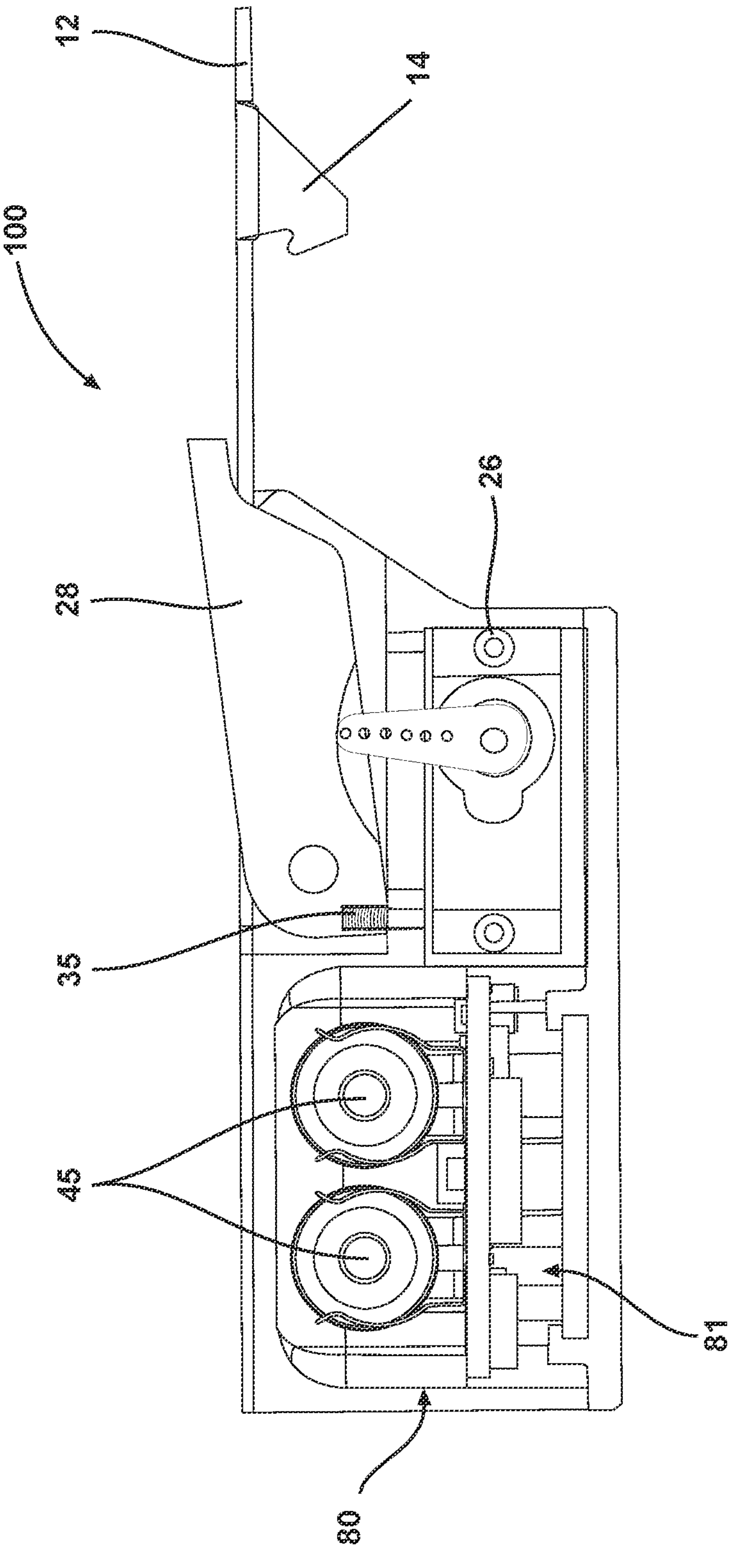

FIG. 4A and FIG. 4B are cut away, side cross-sectional illustrations of the apparatus 100. FIG. 4A illustrates the apparatus in the unlocked configuration and FIG. 4B illustrates the apparatus 100 in the locked configuration. FIG. 4A and FIG. 4B illustrates a cut away view of the apparatus showing a power source 45 of two batteries inside body 80 juxtaposed the remote controllable electronics 81 and integral with the paddle 28 having a spring 35 to assist the paddle remaining in the open (flat) configuration of FIG. 4A. Each illustrates the distal edge 12 and integral barb 14. The electromechanical actuator 24 of FIGS. 4A & 4B is a servo and not engaged to open the paddle 28. Once the apparatus is hung in the strike plate of a door jamb (not shown), the remote controllable electronics may be actuated to power the electromechanical actuator 24 (servo 26) and place the paddle in position as shown in FIG. 4B to lock the door.

Figure 5:
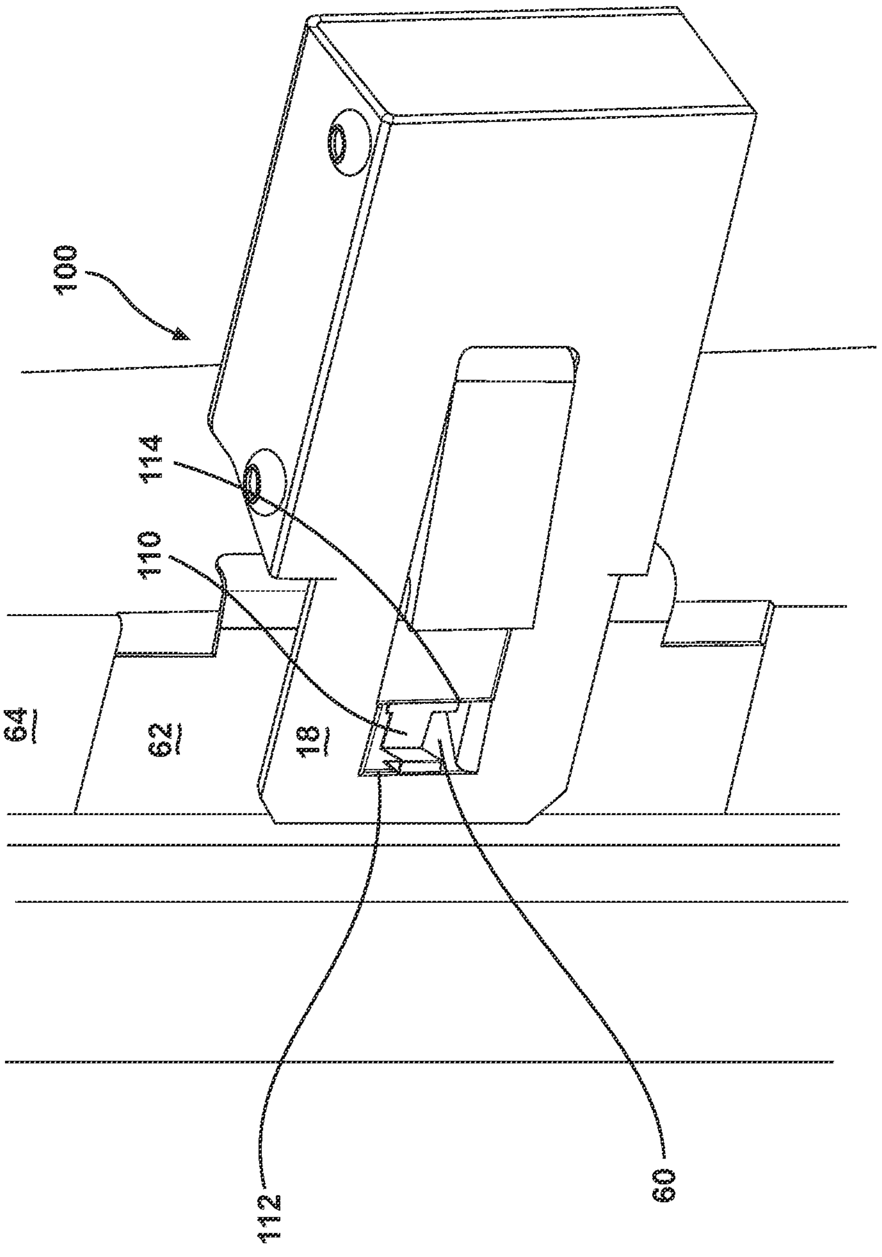
FIG. 5 depicts an embodiment of the disclosed and claimed apparatus having a retainer.

Turning attention to FIG. 5, some embodiments of the disclosed invention may include a retainer 110. The retainer 110 is configured to detachably mate the apparatus 110 to the strike plate 62. In the absence of the retainer 110, the apparatus 100 serves its purpose of preventing the door 66 (not shown in this figure) from being opened by unauthorized individuals, but the apparatus 100 may fall out of the aperture 60 of the strike plate 62 while opening and closing the door 66. During a closing event, such a decoupling of the apparatus 100 from the aperture 60 of the strike plate 62 will prevent a user from successfully securing the door 66 of an occupied room. Similarly, if the decoupling of the apparatus 110 from the aperture 60 of the strike plate 62 during an opening event, damage to the apparatus 100 or adjacent property may occur.

The retainer 110 operates by providing a frictional engagement between the first edge 112 of the aperture 60. This, in turn, drives the barbs 66 (not shown in this figure), into a more secure engagement with the second edge 114 of the aperture 60. As such, the apparatus 100 is sufficiently trapped within the aperture 60, so as not to become dislodged during an opening or closing event, yet a user may remove the apparatus 100 by pivoting the apparatus 100 to overcome the frictional engagement between the retainer 110 and the first edge 112. In some embodiments, the retainer may be integral to the stamping of the tang 18. Some embodiments may include a rubber face or other resilient member to assist in establishing a frictional engagement. Further still, some embodiments may use a resilient member or cammed surface to create a frictional engagement with surfaces other than the first edge 112 and second edge 114.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A remotely controlled inswing portable door lock apparatus for an inswing door having an in-room side and an out-room side; having a strike plate, the strike plate having an aperture, the apparatus comprising:

a blade including a barb at a distal end and a tang at a proximal end, wherein the barb is configured to be disposed within the aperture of a strike plate to hold the apparatus in the strike plate aperture such that the blade and barb support the apparatus in a vertical, stand-alone, portably mounted position to the strike plate while the inswing door is in an open position;

a body having a top and a bottom, wherein the body is operably coupled to the tang of the blade;

a paddle moveably coupled to the body and configured to selectively move between a first orientation substantially flush with the top of the body and a second orientation protruding from the top of the body wherein the door may be slam locked over the open paddle from the out-room side;

a remotely controllable electronics module coupled to the body and configured to operate an electromechanical actuator in cooperation with the paddle from the out-room side and configured to remotely and selectively position the paddle between the first orientation and the second orientation, and wherein the paddle will return to the second orientation after being temporarily displaced to the first orientation, allowing exit of the in-room side to the out-room side, followed by the slam lock.

2. The apparatus of claim 1, further including a retainer, wherein the retainer is configured to secure the barb within the aperture of the strike plate during a closing of the door.

3. The apparatus of claim 2, wherein the paddle is biased to the second orientation, and wherein the paddle will automatically return to the second position after being temporarily displaced to the first orientation.

4. The apparatus of claim 2, further including an electromechanical actuator extension coupled between the electromechanical actuator and the paddle, wherein the electromechanical actuator extension is configured to adjust the spatial relationship between the paddle and the barb allowing the door to temporarily deflect the paddle and the paddle include at least one blade with at least one barb acting as an indexing feature between the inswing door and the aperture and providing a tight-fitting relationship such that the door is secured by pushing the door shut.

* * * * *